US010311236B2

(12) United States Patent
Nadarajah et al.

(10) Patent No.: US 10,311,236 B2
(45) Date of Patent: Jun. 4, 2019

(54) SECURE SYSTEM MEMORY TRAINING

(71) Applicants: Advanced Micro Devices, Inc., Sunnyvale, CA (US); ATI Technologies ULC, Markham (CA)

(72) Inventors: Kathirkamanathan Nadarajah, Richmond Hill (CA); Oswin Housty, Austin, TX (US); Sergey Blotsky, Etobicoke (CA); Tan Peng, Richmond Hill (CA); Hary Devapriyan Mahesan, North York (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 132 days.

(21) Appl. No.: 15/358,640

(22) Filed: Nov. 22, 2016

(65) Prior Publication Data

US 2018/0144136 A1   May 24, 2018

(51) Int. Cl.
| | |
|---|---|
| *G06F 9/00* | (2006.01) |
| *G06F 15/177* | (2006.01) |
| *G06F 21/57* | (2013.01) |
| *G06F 9/4401* | (2018.01) |

(52) U.S. Cl.
CPC .......... *G06F 21/575* (2013.01); *G06F 9/4405* (2013.01)

(58) Field of Classification Search
CPC ....................................................... G06F 9/44
See application file for complete search history.

(56) References Cited

U.S. PATENT DOCUMENTS

| | | | |
|---|---|---|---|
| 8,239,686 B1 * | 8/2012 | Hodzic | G06F 21/51 713/187 |
| 8,760,946 B2 | 6/2014 | Dearth et al. | |
| 9,471,799 B2 | 10/2016 | Schiffman et al. | |
| 2006/0020845 A1 * | 1/2006 | Broyles, III | G06F 11/1417 714/2 |
| 2006/0179324 A1 * | 8/2006 | Hatakeyama | G06F 12/1408 713/187 |
| 2009/0288160 A1 * | 11/2009 | Esliger | G06F 21/572 726/17 |
| 2011/0040902 A1 | 2/2011 | Housty | |
| 2013/0254906 A1 * | 9/2013 | Kessler | G06F 21/57 726/34 |

(Continued)

*Primary Examiner* — Mohammed H Rehman
(74) *Attorney, Agent, or Firm* — Meyertons Hood Kivlin Kowert and Goetzel PC; Rory D. Rankin (57) ABSTRACT

Systems, apparatuses, and methods for performing secure system memory training are disclosed. In one embodiment, a system includes a boot media, a security processor with a first memory, a system memory, and one or more main processors coupled to the system memory. The security processor is configured to retrieve first data from the boot media and store and authenticate the first data in the first memory. The first data includes a first set of instructions which are executable to retrieve, from the boot media, a configuration block with system memory training parameters. The security processor also executes a second set of instructions to initialize and train the system memory using the training parameters. After training the system memory, the security processor retrieves, authenticates, and stores boot code in the system memory and releases the one or more main processors from reset to execute the boot code.

17 Claims, 7 Drawing Sheets

(56) References Cited

U.S. PATENT DOCUMENTS

2015/0309803 A1* 10/2015 Sahu .................. G06F 9/4403
                                                     714/21
2017/0099604 A1*  4/2017 Raleigh ............... H04W 12/12
2017/0255775 A1*  9/2017 Sorresso ............. G06F 21/563
2018/0075242 A1*  3/2018 Khatri ................ G06F 21/575

* cited by examiner

SECURE SYSTEM MEMORY TRAINING

BACKGROUND

Description of the Related Art

Computer systems typically include boot-up firmware called the basic input/output system (BIOS) which is used to perform hardware initialization on power-up. The BIOS is machine code stored in a non-volatile memory, and the BIOS allows a main processor (e.g., central processing unit (CPU)) of the system to control important computer system functions while booting up the system. Upon power up, the main processor will boot up the system by retrieving and executing the code stored in the BIOS. In some systems, Unified Extensible Firmware Interface (UEFI) firmware can be used in place of the BIOS.

Since the BIOS is the first code that runs on the system and since the BIOS has access to all hardware of the system, methods of compromising the BIOS are continually being developed by malicious users. If a system boots up without authenticating the BIOS execution code, or if the window between authenticating and executing the BIOS execution code is lengthy, this exposes a system vulnerability.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing secure system memory training are disclosed. In one embodiment, a system includes a boot media, a security processor with a first memory, a system memory, and one or more main processors coupled to the system memory. In one embodiment, prior to releasing the one or more main processors from reset, the security processor is configured to load and authenticate multiple blocks of data from the boot media into the first memory, wherein at least one block of data includes a bootloader, wherein the bootloader comprises a set of executable instructions. Then, the security processor executes a given bootloader to initialize and train the system memory prior to releasing the one or more main processors from reset.

In one embodiment, the security processor loads a first block of data from the boot media into the first memory, wherein the first block of data includes a kernel executable by the security processor. In one embodiment, the kernel is executable by the security processor to fetch a second block of data from the boot media and store and authenticate the second block of data in the first memory, wherein the second block of data comprises a first bootloader. In one embodiment, the security processor is configured to execute the first bootloader to fetch a third block of data from the boot media and store and authenticate the third block of data in the first memory. In one embodiment, the third block of data includes a configuration block, wherein the configuration block includes parameters for initializing and training the system memory.

In one embodiment, the security processor is further configured to execute the first bootloader to fetch a fourth block of data from the boot media and store and authenticate the fourth block of data in the first memory, wherein the fourth block of data includes a second bootloader. In one embodiment, the security processor is configured to execute the second bootloader to initialize and train the system memory, wherein the second bootloader retrieves one or more parameters from the configuration block for initializing and training the system memory.

In one embodiment, responsive to completing training of the system memory, the security processor is configured to retrieve boot code (e.g., basic input/output system (BIOS) execution code) from the boot media. Next, the security processor is configured to store the boot code in the system memory, authenticate the boot code, and then release the one or more main processors from reset to allow the one or more main processors to execute the boot code from the system memory. In one embodiment, responsive to completing training of the system memory, the security processor is configured to store an output buffer into another storage medium, wherein the output buffer comprises results of the memory training and of the overall initialization process.

In one embodiment, a system includes multiple nodes and a plurality of security processors, with each node including a separate security processor. In this embodiment, a first security processor is designated as a master security processor and one or more other security processors are designated as slave security processors. The master security processor collects initialization and training results from the slave security processors. In one embodiment, the initialization process for the system includes a plurality of synchronization points. Depending on the embodiment, the synchronization primitives between the master and slave security processors can be interrupt driven, polling based, or otherwise. In one embodiment, the master security processor causes each slave security processor to wait at a given synchronization point until all of the security processors have reached the given synchronization point.

Figure 1:
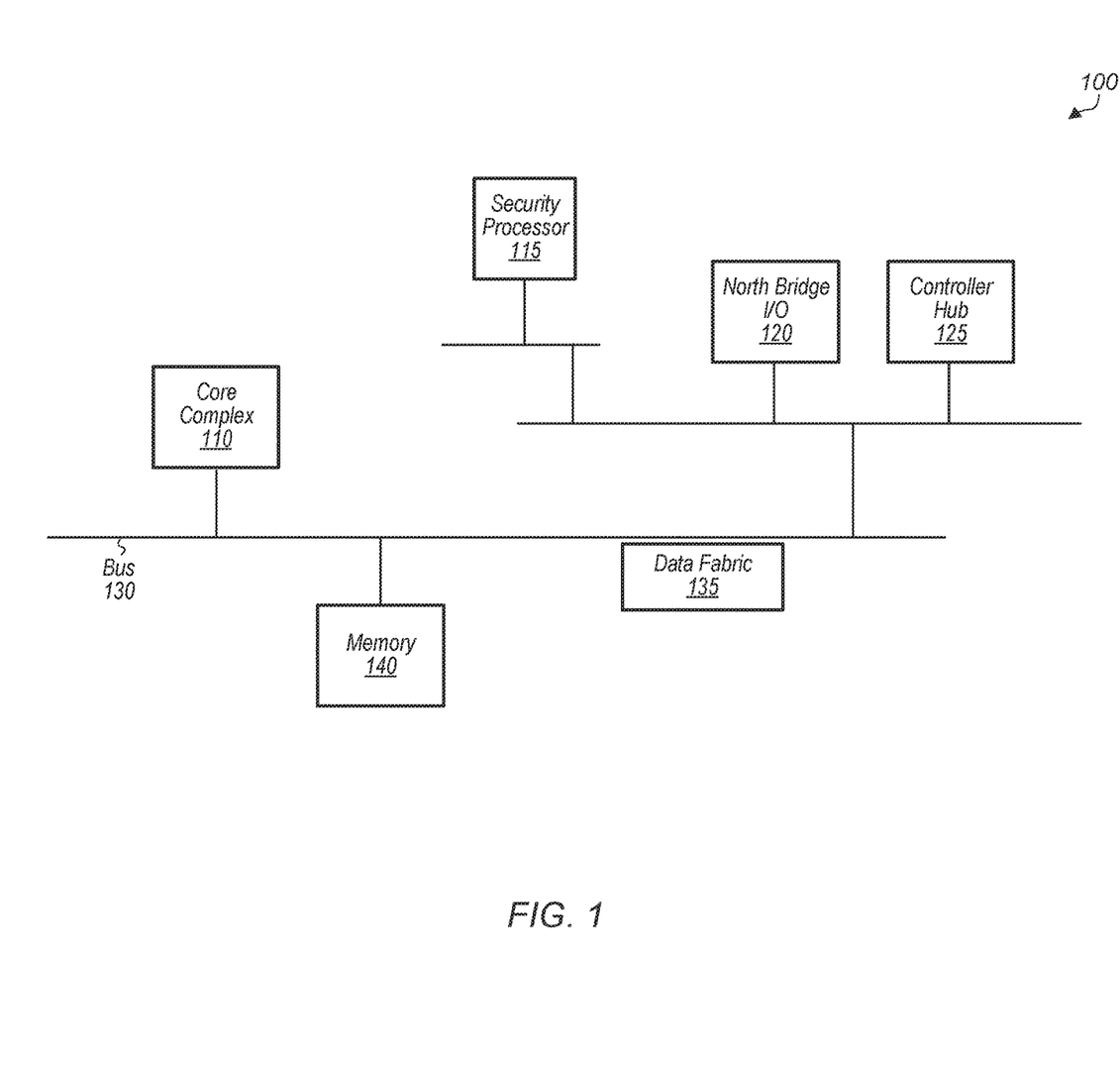
FIG. 1 is a block diagram of one embodiment of a computing system.

Referring now to FIG. 1, a block diagram of one embodiment of a computing system 100 is shown. In this embodiment, computing system 100 includes core complex 110, security processor 115, north bridge input/output (I/O) unit 120, controller hub 125, bus 130, data fabric 135, and memory 140. It is noted that system 100 can also be referred to as a system on chip (SoC), integrated circuit (IC), or node. Core complex 110 is representative of any number and type of processors (e.g., central processing unit (CPU), graphics processing unit (GPU)) with any number of cores. Each processor core includes one or more execution units, cache memories, schedulers, branch prediction circuits, and so forth. In one embodiment, the processor(s) of core complex 110 are configured to execute the main control software of system 100, such as an operating system. Generally, software executed by core complex 110 during use can control the other components of system 100 to realize the desired functionality of system 100. Core complex 110 can also execute other software, such as application programs.

In various embodiments, memory 140 includes one or more memory modules and also includes memory slots for the addition or replacement of memory modules. It is noted that memory 140 is also referred to as "system memory" herein. A memory controller in controller hub 125 is programmed to interface to a variety of different memory modules. If memory 140 is implemented with different types of memory modules, then the memory controller is programmed with parameters that allow each memory module to operate correctly. In one embodiment, the programming of the memory controller with these parameters is one of the steps of the "memory training" process.

In one embodiment, security processor 115 is configured to manage the configuration and security of system 100. In various embodiments, security processor 115 is preloaded with any number of public/private keys. As used herein, the term "security processor" is defined as an apparatus configured to execute instructions for performing authentication and validation functions which provide security protection for system 100. A main processor in core complex 110 is differentiated from a security processor, with the main processor executing operating system instructions and user application instructions. An additional differentiating factor between a main processor and security processor 115 is that security processor 115 includes one or more security-related mechanisms (e.g., random number generator, cryptographic coprocessor). Also, security processor 115 stores one or more unique encryption/decryption keys inaccessible to the rest of system 100. Accordingly, security processor 115 provides a hardware-based root of trust for system 100, allowing system 100 to start up in a secure environment.

In one embodiment, security processor 115 manages the boot-up process of system 100 to ensure that system 100 boots up with authenticated boot code. Security processor 115 also manages various other functions associated with the boot-up process of system 100. In one embodiment, security processor 115 trains memory 140 during boot-up and then transfers boot code into memory 140 after training is complete. Then, security processor 115 releases core complex 110 to execute the boot code and to launch the operating system of system 100.

The various components of system 100 are coupled to each other via bus 130, which is representative of any number and type of buses, interconnects, fabrics, and the like. Security processor 115 is coupled to north bridge I/O unit 120 and controller hub 125 via bus 130. North bridge I/O unit 120 is coupled to any number of I/O devices, peripheral devices, and/or other logic. A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) can be coupled to north bridge I/O unit 120. Various types of peripheral devices can be coupled to some or all of the peripheral buses. Such peripheral devices include (but are not limited to) keyboards, mice, printers, scanners, joysticks or other types of game controllers, media recording devices, external storage devices, network interface cards, and so forth.

Controller hub 125 includes one or more controllers (e.g., memory controller) for accessing memory 140 and/or data fabric 135. Memory 140 includes the system memory for system 100, and memory 140 includes any number and type of memory devices, which can vary from embodiment to embodiment. In some embodiments, memory 140 includes a plurality of memory modules. Each of the memory modules includes one or more memory devices (e.g., memory chips) mounted thereon. In some embodiments, memory 140 includes one or more memory devices mounted on a motherboard or other carrier upon which other components of system 100 are also mounted. In some embodiments, at least a portion of memory 140 is implemented on the die of system 100. The memory devices used to implemented memory 140 include (but are not limited to) random access memory (RAM), static RAM (SRAM), dynamic RAM (DRAM), double data rate (DDR) DRAM, DDR2 DRAM, DDR3 DRAM, DDR4 DRAM, and so forth.

In various embodiments, computing system 100 can correspond to any of various types of computer systems or computing devices, including, but not limited to, a personal computer system, desktop computer, laptop or notebook computer, computing node, supercomputer, mobile device, tablet, phone, smartphone, mainframe computer system, handheld computer, workstation, network computer, watch, wearable device, a consumer device, server, file server, application server, storage server, web server, cloud computing server, or in general any type of computing system or device or portion thereof. It is noted that the number of components of computing system 100 can vary from embodiment to embodiment. There can be more or fewer of each component/subcomponent than the number shown in FIG. 1. It is also noted that computing system 100 can include other components not shown in FIG. 1. Additionally, in other embodiments, computing system 100 can be structured in other ways than shown in FIG. 1.

Figure 2:
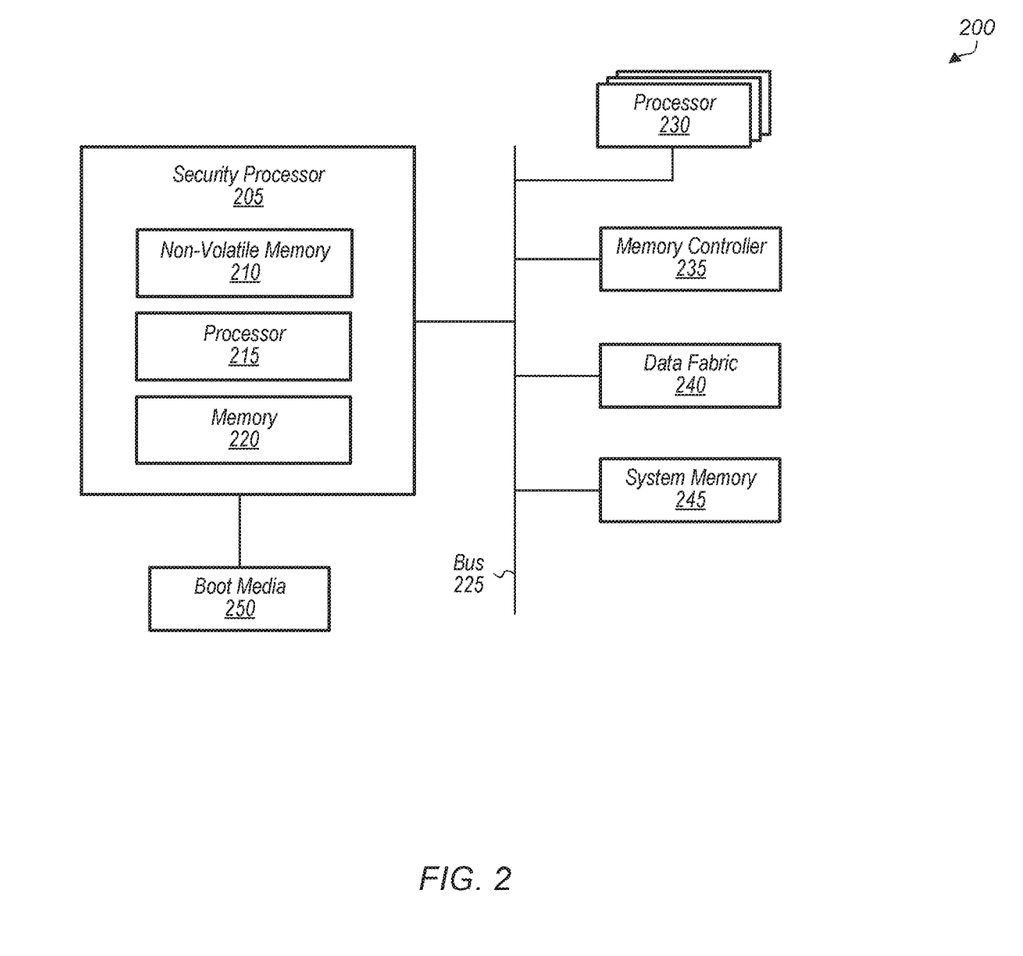
FIG. 2 is a block diagram of one embodiment of a system on chip (SoC).

Turning now to FIG. 2, a block diagram of one embodiment of a system on chip (SoC) 200 is shown. In one embodiment, SoC 200 includes security processor 205 coupled to processor(s) 230, memory controller 235, data fabric 240, and system memory 245 via bus 225. Security processor 205 is also coupled to boot media 250 which stores boot code and other configuration data. In one embodiment, security processor includes non-volatile memory 210, processor 215, and memory 220. In one embodiment, non-volatile memory 210 is a read-only memory (ROM). In other embodiments, non-volatile memory 210 is other types of memory devices. Processor 215 is representative of any number and type of processors which are included within security processor 205. Memory 220 is representative of any number and type of memory devices for use by processor 215. In one embodiment, memory 220 is a static random-access memory (SRAM).

In one embodiment, non-volatile memory 210 stores one or more portions of boot code which are executable by processor 215. In one embodiment, when power is first applied to SoC 200, processor 215 is configured to retrieve boot code from on-chip non-volatile memory 210 and store and authenticate the boot code into memory 220. Processor 215 is configured to authenticate the boot code using any of various authentication techniques, which can vary from embodiment to embodiment. For example, in one embodiment, processor 215 performs authentication and validation of the boot code based on public key cryptography. In this embodiment, processor 215 performs authentication by verifying a digital signature embedded in the boot code. Then, processor 215 executes the boot code from memory 220. This on-chip boot code is executable by processor 215 to retrieve firmware from boot media 250. This firmware includes a kernel which is loaded into memory 220, authenticated, and then executed by processor 215.

In one embodiment, the kernel is executable by processor 215 to load a first bootloader from boot media 250 into memory 220. After authenticating the first bootloader, processor 215 executes the first bootloader to load a configuration block and a second bootloader into memory 220. Processor 215 also authenticates the configuration block and the second bootloader. The configuration block includes parameters for dynamically initializing and training system memory 245 and data fabric 240. In one embodiment, processor 215 executes the second bootloader which retrieves parameters from the configuration block to initialize and train system memory 245 and data fabric 240. For example, in one embodiment, during memory training, serial presence detect (SPD) values of system memory 245 are probed by processor 215. The SPD values include information such as timing parameters, manufacturer, serial number and other useful information about system memory 245. This data allows processor 215 to automatically determine key parameters of system memory 245. The configuration block includes information for processor 215 to access this data for the memory module(s) of system memory 245.

In other embodiments, processor 215 also loads, authenticates, and executes any number of other bootloaders from boot media 250 into memory 220 to perform other tasks during the initialization process of SoC 200. After completing training of system memory 245 and performing other tasks during the initialization process of SoC 200, processor 215 generates and stores an output block with the results of the memory training and initialization process in system memory 245. Also, processor 215 loads and authenticates the BIOS execution code from boot media 250 into memory 220. Then, processor 215 stores the BIOS execution code in system memory 245. After the BIOS execution code is stored in system memory 245, processor 215 releases main processor(s) 230 from reset to execute the BIOS execution code.

It is noted that in other embodiments, the above-described sequence of steps can be altered to change the order of steps, to add one or more additional steps, or to remove one or more of the listed steps. It should be understood that the above description is representative of one embodiment of a security processor executing boot-up code and performing the SoC initialization process. In other embodiments, other examples of boot-up sequences can be utilized.

Figure 3:
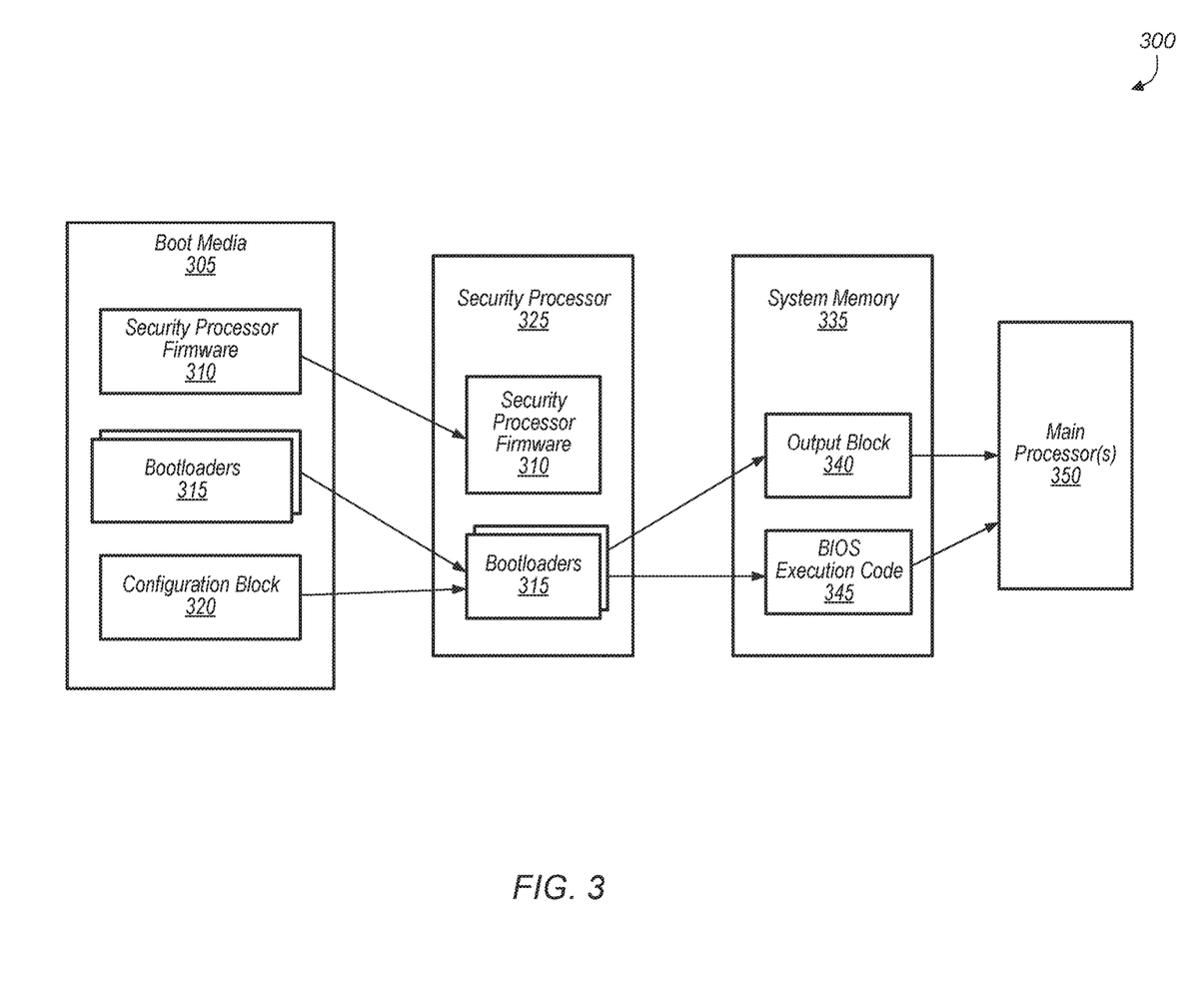
FIG. 3 is a block diagram of one embodiment of the components utilized for booting up a computing system.

Referring now to FIG. 3, a block diagram of one embodiment of the components utilized for booting up a computing system 300 is shown. System 300 includes at least boot media 305, security processor 325, system memory 335, and main processor(s) 350. Boot media 305 is representative of any number and type of boot media (e.g., ROM, embedded multimedia card (EMMC), flash drive, serial peripheral interface (SPI) flash, electrically erasable programmable ROM (EEPROM)), which can vary from embodiment to embodiment.

On system boot-up, security processor 325 loads security processor firmware 310 from boot media 305 into the local memory of security processor 325. Security processor firmware 310 is also referred to as a kernel herein. Then, the security processor firmware 310 executes on security processor 325 to load and authenticate at least a first bootloader of bootloaders 315 from boot media 305 into its local memory. Bootloaders 315 are binary firmware images which are executable by security processor 325, with each binary firmware image including a set of executable instructions. In one embodiment, bootloaders 315 are stored in the boot media 305 in locations specified in a BIOS directory. The configuration block 320 is also loaded and authenticated into the local memory of security processor 325. Configuration block 320 includes parameters for initializing and training system memory 335 and/or other components (e.g., data fabric) of system 300.

In one embodiment, multiple bootloaders 315 are loaded, authenticated, and executed by security processor 325 to perform the multiple stages of the initialization process for system 300. After security processor firmware 310 loads and authenticates the first bootloader 315 from boot media 305 into the local memory of security processor 325, security processor 325 executes first bootloader 315 to load and authenticate configuration block 320 and a second bootloader 315 from boot media 305 into the local memory of security processor 325. Next, security processor 325 executes second bootloader 315 to retrieve parameters from configuration block 320 and utilize the parameters to initialize and train system memory 335. In one embodiment, configuration block 320 includes a plurality of parameters, configuration data, and control data for training system memory 335 and the data fabric (not shown). Depending on the embodiment, the parameters in configuration block 320 specify serial presence detect (SPD) addresses, if dynamic random-access memory (DRAM) bank interleaving is enabled, if error-correcting codes (ECC) are enabled, if parity is enabled, the maximum memory bus clock frequency, the number of dual in-line memory modules (DIMMs) per channel, the system management bus (SMBus) address, mux information, and/or one or more other parameters.

After system memory 335 and the data fabric is trained, a bootloader 315 executing on security processor 325 generates output block 340 and stores output block 340 in system memory 335. In one embodiment, output block 340 includes the system memory size, the system memory map, system memory frequency, memory training errors, and/or additional information. Security processor 325 also loads and authenticates BIOS execution code 345 and then stores BIOS execution code 345 in system memory 335 for main processor(s) 350 to execute when main processor(s) 350 are released from reset. Then, security processor 325 releases main processor(s) 350 from reset and main processor(s) execute BIOS execution code 345 and analyze output block 340. Main processor(s) 350 are representative of any number and type of processors for executing the operating system and application software of system 300. Depending on the embodiment, main processor(s) 350 implement any suitable instruction set architecture (ISA) (e.g., x86®). In one embodiment, during the initialization process, while bootloaders 315 are executing on security processor 325, security processor 325 generates and provides progress and status information about the initialization process via an output port (not shown) to an external device for debug purposes. The status information includes the results of the initialization process and any errors that were detected during the initialization process.

Figure 4:
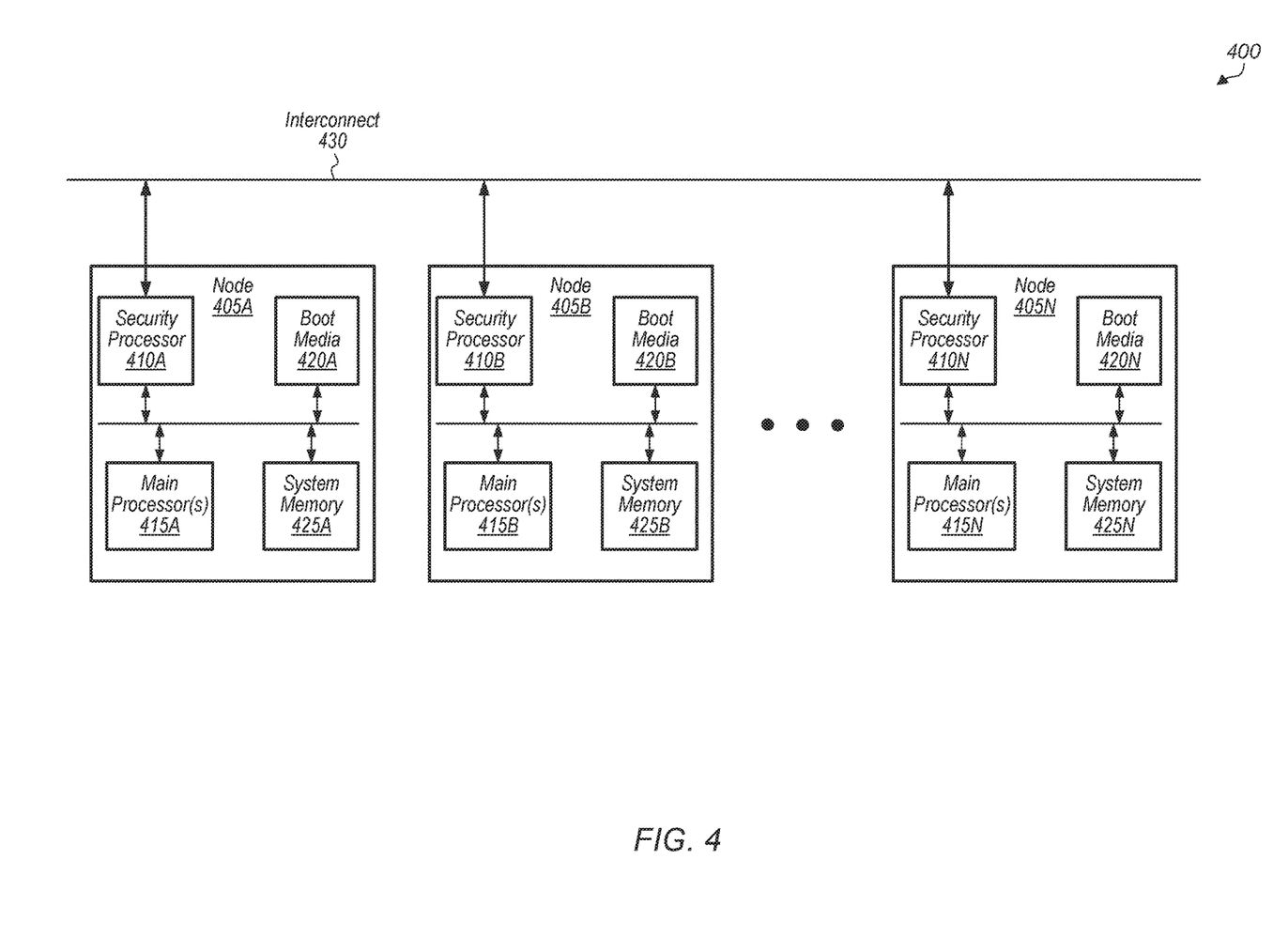
FIG. 4 is a block diagram of one embodiment of multi-node computing system.

Turning now to FIG. 4, a block diagram of one embodiment of a multi-node computing system 400 is shown. System 400 includes nodes 405A-N, which are representative of any number and type of computing nodes. In one embodiment, each node 405A-N includes at least a corresponding security processor 410A-N, main processor(s) 415A-N, boot media 420A-N, and system memory 425A-N. In some embodiments, one or more of nodes 405A-N include multiple security processors. The security processor 410A-N of nodes 405A-N communicate via interconnect 430, which is representative of any type of bus, interconnect, fabric, network, or other type of connection.

Generally speaking, a node 405A-N is defined as an apparatus or system with at least one computing/processing element (e.g., processor, processor core, programmable logic device, application specific integrated circuit) and at least one memory device. The at least one computing element of the node is configured to execute instructions and/or perform one or more types of computations (e.g., floating point, integer, memory, I/O) depending on the embodiment. The components of each node 405A-N are interconnected by one or more communication buses. In one embodiment, the functionality of nodes 405A-N is incorporated into a single integrated circuit. In another embodiment, the functionality of nodes 405A-N is incorporated in a chipset on a computer motherboard. In one embodiment, each node 405A-N is a stand-alone system within a mobile computer, a desktop, a server, or other device or system. In another embodiment, each node 405A-N is a socket of a multi-socket system 400. In a further embodiment, each node 405A-N is a separate die of a multi-die system 400.

In one embodiment, one of the security processors 410A-D is designated as the master security processor, and the rest of the security processors 410A-D are designated as slave security processors. During boot-up of system 400, each security processor 410A-D executes a multi-stage initialization sequence in parallel with the other security processors 410A-D. In one embodiment, there are multiple synchronization points during the multi-stage initialization sequence. In one embodiment, at each synchronization point, the master security processor communicates with the slave security processors. Once all of the slave security processors have indicated to the master security processor that they have reached the synchronization point, the master security processor triggers the next stage of the initialization process for all of the security processors. In one embodiment, the master security processor performs one or more tasks for the slave security processors during the multi-stage initialization process. For example, in one embodiment, the master security processor retrieves the addresses of memory modules from the configuration blocks and then provides these addresses to the slave security processors.

Depending on the embodiment, any number and type of synchronization points are implemented during the multi-stage initialization process. For example, in one embodiment, a first synchronization point is implemented for providing the master security processor with the speed of the memory modules on all of the nodes. A second synchronization point is implemented to coordinate the amount of memory on each of the nodes. A third synchronization point is implemented for sharing error information from all of the nodes to the master security processor. It is noted that the terms "first", "second", and "third" are not intended to denote a required ordering of synchronization points. In other embodiments, other numbers and type of synchronization points can be implemented, in any type of order, during the initialization process.

Figure 5:
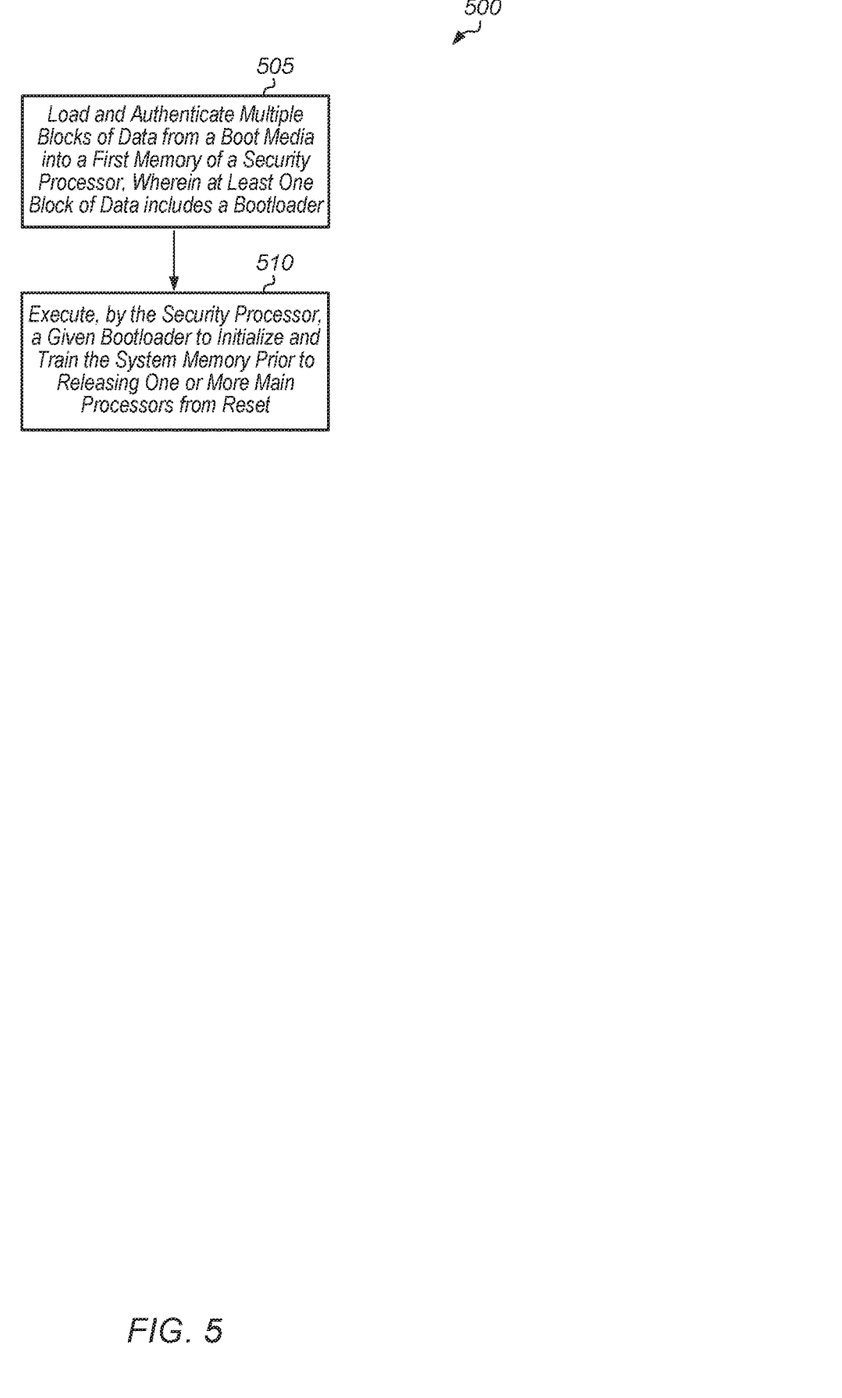
FIG. 5 is a generalized flow diagram illustrating one embodiment of a method for performing secure system memory training.
Figure 6:
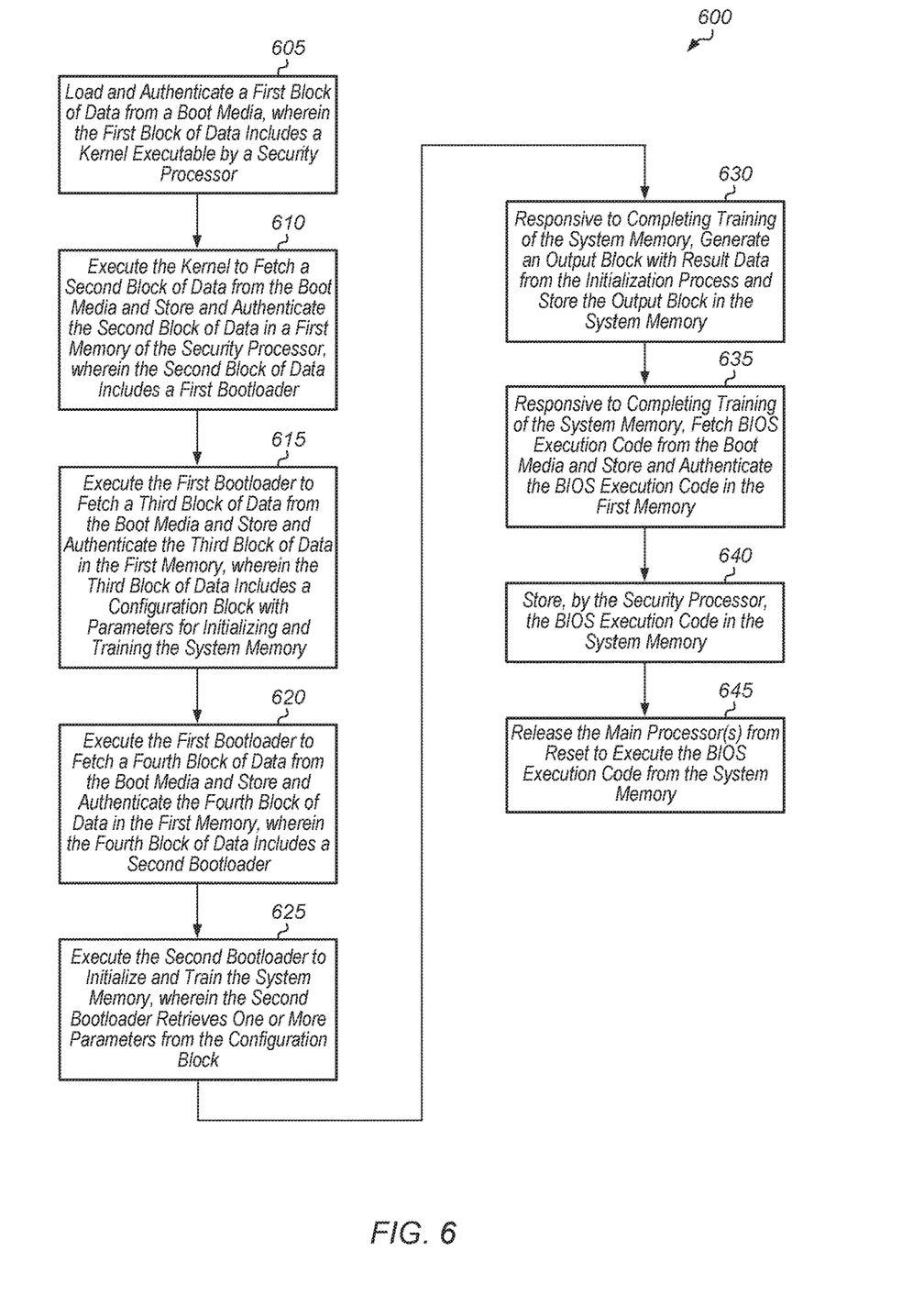
FIG. 6 is a generalized flow diagram illustrating one embodiment of a method for executing system on chip (SoC) initialization code by a security processor.
Figure 7:
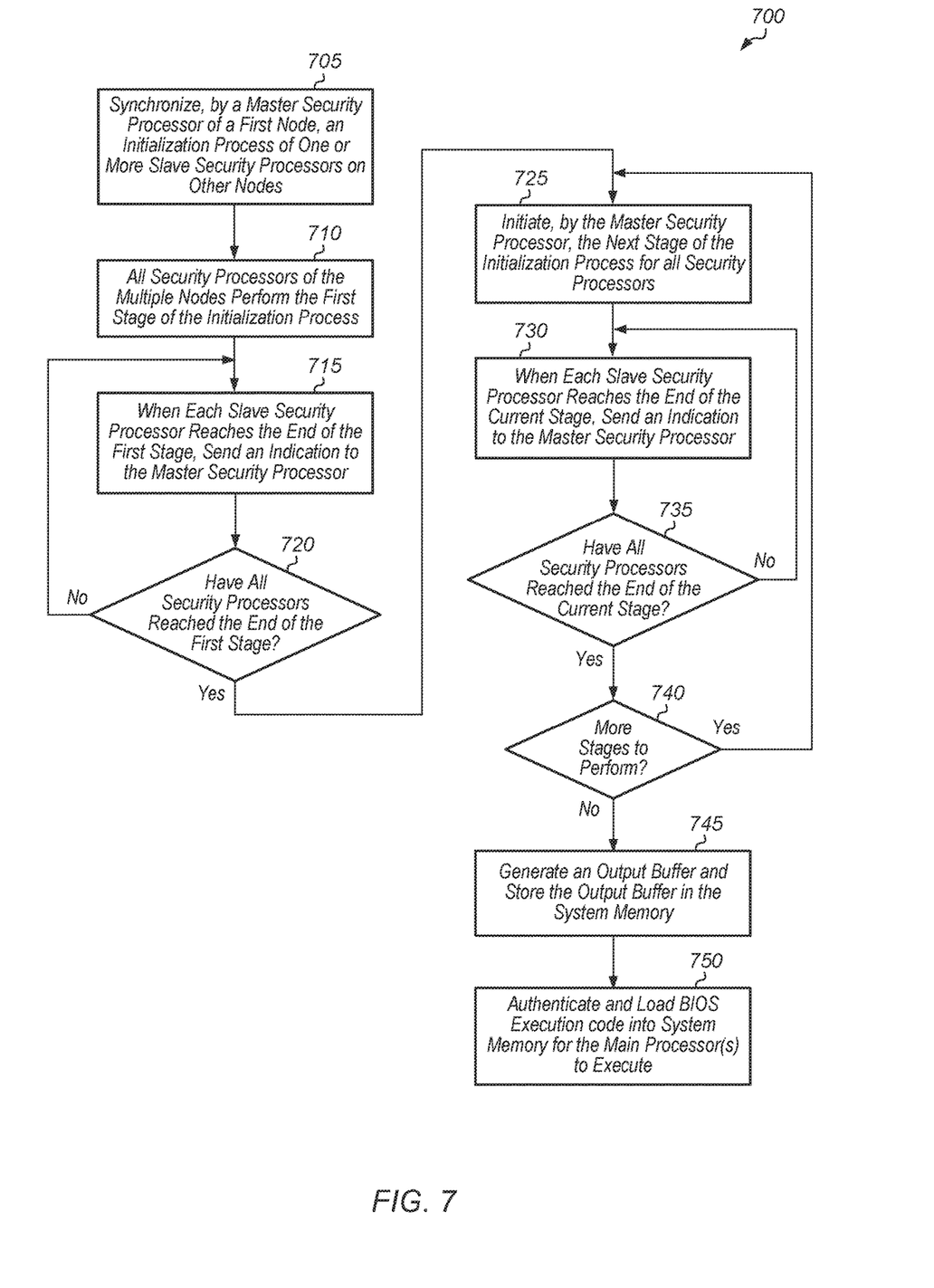
FIG. 7 is a generalized flow diagram illustrating one embodiment of a method for performing an initialization process for multiple nodes.

Referring now to FIG. 5, one embodiment of a method 500 for performing secure system memory training is shown. For purposes of discussion, the steps in this embodiment and those of FIGS. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A security processor loads and authenticates multiple blocks of data from a boot media into a first memory of the security processor, wherein at least one block of data includes a bootloader, wherein the bootloader comprises a set of executable instructions (block 505). Each block of data includes any amount of data, with the amount of data varying from embodiment to embodiment. In one embodiment, the security processor and boot media are part of a computing system that also includes a system memory with one or more memory devices and one or more main processors coupled to the system memory. The security processor executes a given bootloader to initialize and train the system memory prior to releasing the one or more main processors from reset (block 510). After block 510, method 500 ends.

Turning now to FIG. 6, one embodiment of a method 600 for executing system on chip (SoC) initialization code by a security processor is shown. On boot-up, a security processor loads and authenticates a first block of data from a boot media, wherein the first block of data includes a kernel executable by the security processor (block 605). The kernel includes a set of instructions which are executable by the security processor. Next, the security processor executes the kernel to fetch a second block of data from the boot media and store and authenticate the second block of data in a first memory of the security processor, wherein the second block of data includes a first bootloader (block 610). Next, the security processor executes the first bootloader to fetch a third block of data from the boot media and store and authenticate the third block of data in the first memory, wherein the third block of data includes a configuration block with parameters for initializing and training the system memory (block 615).

Then, the security processor executes the first bootloader to fetch a fourth block of data from the boot media and store and authenticate the fourth block of data in the first memory, wherein the fourth block of data includes a second bootloader (block 620). Next, the security processor executes the second bootloader to initialize and train the system memory, wherein the second bootloader retrieves one or more parameters from the configuration block (block 625). Responsive to completing training of the system memory, the security processor generates an output block with result data from the initialization process and stores the output block in the system memory (block 630). Also, responsive to completing training of the system memory, the security processor fetches BIOS execution code from the boot media and stores and authenticates the BIOS execution code in the first memory (block 635). Next, the security processor stores the BIOS execution code in the system memory (block 640). Then, the security processor releases the main processor(s) from reset to execute the BIOS execution code from the system memory (block 645). After block 645, method 600 ends.

Referring now to FIG. 7, one embodiment of a method 700 for performing an initialization process for multiple nodes is shown. A master security processor of a first node synchronizes an initialization process of one or more slave security processors on other nodes (block 705). Then, all security processors of the multiple nodes perform the first stage of the initialization process (block 710). Next, when each slave security processor reaches the end of the first stage, the slave security processor sends an indication to the master security processor (block 715). In one embodiment, the slave security processor also sends status data associated with the first stage to the master security processor. If all security processors have reached the end of the first stage (conditional block 720, "yes" leg), then the master security processor initiates the next stage of the initialization process for all of the security processors (block 725). It is noted that the end of the first stage is also referred to as the first synchronization point. If not all of the security processors have reached the end of the first stage (conditional block 720, "no" leg), then method 700 returns to block 715.

After block 725, when each security processor reaches the end of the current stage, the security processor sends an indication to the master security processor (block 730). In one embodiment, the slave security processor also sends status data associated with the current stage to the master security processor. If all slave nodes have reached the end of the current stage (conditional block 735, "yes" leg), then the master node determines if there are any other stages to perform in the initialization process (conditional block 740). If not all of the security processors have reached the end of the current stage (conditional block 735, "no" leg), then method 700 returns to block 730. If there are more stages to perform in the initialization process (conditional block 740, "yes" leg), then method 700 returns to block 725. If there are no more stages to perform in the initialization process (conditional block 740, "no" leg), then the master security processor generates an output buffer and stores the output buffer in the system memory (block 745). Also, the master security processor authenticates and loads BIOS execution code into system memory for the main processor(s) to execute (block 750). After block 750, method 700 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a boot media; and
    a security processor comprising a first memory;
    a system memory comprising one or more memory devices; and
    one or more main processors, separate from the security processor, coupled to the system memory;
    wherein prior to releasing the one or more main processors from reset, the security processor is configured to:
        load and authenticate multiple blocks of data from the boot media into the first memory, wherein at least one block of data includes a first bootloader that comprises a set of executable instructions; and
        execute the first bootloader to:
            fetch a further block of data from the boot media, wherein the further block of data comprises a second bootloader,
                wherein the second bootloader is configured to retrieve one or more parameters from the configuration block for initializing and training the system memory; and
            store and authenticate the second bootloader in the first memory;
        execute the second bootloader to initialize and train the system memory.

2. The system as recited in claim 1, wherein a first block of data comprises a kernel executable by the security processor.

3. The system as recited in claim 2, wherein the kernel is executable by the security processor to:
    fetch a second block of data from the boot media, wherein the second block of data comprises the first bootloader; and
    store and authenticate the second block of data in the first memory.

4. The system as recited in claim 3, wherein the security processor is further configured to execute the first bootloader to:
    fetch a third block of data from the boot media, wherein the third block of data comprises a configuration block comprising parameters for initializing and training the system memory; and
    store and authenticate the configuration block in the first memory.

5. The system as recited in claim 1, wherein responsive to completing training of the system memory, the security processor is configured to:
    retrieve basic input/output system (BIOS) execution code from the boot media and store the BIOS execution code in the first memory; and
    authenticate the BIOS execution code.

6. The system as recited in claim 5, wherein responsive to completing training of the system memory, the security processor is further configured to:
    store the BIOS execution code in the system memory; and
    release the one or more main processors from reset to allow the one or more main processors to execute the BIOS execution code from the system memory.

7. A method comprising:
    prior to releasing one or more main processors from reset, a security processor separate from the one or more main processors:
        loading and authenticating multiple blocks of data from a boot media into a first memory of the security processor, wherein at least one block of data includes a first bootloader that comprises a set of executable instructions;
        executing the first bootloader to:
            fetch a further block of data from the boot media, wherein the further block of data comprises a second bootloader wherein the second bootloader is configured to retrieve one or more parameters from the configuration block for initializing and training the system memory; and store and authenticate the second bootloader in the first memory;

executing, by the security processor, the second bootloader to initialize and train a system memory.

8. The method as recited in claim 7, wherein a first block of data comprises a kernel executable by the security processor.

9. The method as recited in claim 8, further comprising executing the kernel to:

fetch a second block of data from the boot media, wherein the second block of data comprises the first bootloader; and store and authenticate the second block of data in the first memory.

10. The method as recited in claim 9, further comprising executing the first bootloader to:

fetch a third block of data from the boot media, wherein the third block of data comprises a configuration block, wherein the configuration block comprises parameters for initializing and training the system memory; and store and authenticate the configuration block in the first memory.

11. The method as recited in claim 7, wherein responsive to completing training of the system memory, the method further comprising:

retrieving basic input/output system (BIOS) execution code from the boot media and storing the BIOS execution code in the first memory; and authenticating the BIOS execution code.

12. The method as recited in claim 11, wherein responsive to completing training of the system memory, the method further comprising:

storing the BIOS execution code in the system memory; and releasing the one or more main processors from reset to allow the one or more main processors to execute the BIOS execution code from the system memory.

13. A non-transitory computer readable storage medium storing program instructions, wherein the program instructions are executable by a processor to:

load and authenticate multiple blocks of data from a boot media into a first memory of a security processor, wherein at least one block of data includes a first bootloader that comprises a set of executable instructions;

execute the first bootloader to:

fetch a further block of data from the boot media, wherein the further block of data comprises a second bootloader, wherein the second bootloader is configured to retrieve one or more parameters from the configuration block for initializing and training the system memory; and store and authenticate the second bootloader in the first memory;

execute the second bootloader to initialize and train a system memory.

14. The non-transitory computer readable storage medium as recited in claim 13, wherein a first block of data comprises a kernel executable by the security processor.

15. The non-transitory computer readable storage medium as recited in claim 1, wherein the program instructions are further executable by a processor to:

fetch a third block of data from the boot media, wherein the third block of data comprises a configuration block, wherein the configuration block comprises parameters for initializing and training the system memory; and store and authenticate the configuration block in the first memory.

16. The non-transitory computer readable storage medium as recited in claim 15, wherein the program instructions are further executable by a processor to:

store and authenticate the second bootloader in the first memory;

wherein the second bootloader retrieves one or more parameters from the configuration block for initializing and training the system memory.

17. The non-transitory computer readable storage medium as recited in claim 13, wherein responsive to completing training of the system memory, the program instructions are executable by a processor to:

retrieve basic input/output system (BIOS) execution code from the boot media and store the BIOS execution code in the first memory; and authenticate the BIOS execution code.

* * * * *

UNITED STATES PATENT AND TRADEMARK OFFICE
CERTIFICATE OF CORRECTION

PATENT NO. : 10,311,236 B2
APPLICATION NO. : 15/358640
DATED : June 4, 2019
INVENTOR(S) : Kathirkamanathan Nadarajah Page 1 of 1

It is certified that error appears in the above-identified patent and that said Letters Patent is hereby corrected as shown below:

In the Claims

Column 12, Claim 15, Line 19, please delete "recited in claim 1" and substitute -- recited in claim 13 --.

Signed and Sealed this
First Day of October, 2019

Andrei Iancu
*Director of the United States Patent and Trademark Office*